(12) United States Patent
Berning et al.

(10) Patent No.: US 7,014,131 B2
(45) Date of Patent: Mar. 21, 2006

(54) MULTIPLE SPRAY DEVICES FOR AUTOMOTIVE AND OTHER APPLICATIONS

(75) Inventors: Keith Berning, Jessup, MD (US); Daniel E. Steerman, Harpers Ferry, WV (US); Srinivasaiah Sridhara, Ellicott City, MD (US); Gregory Russell, Baltimore, MD (US)

(73) Assignee: Bowles Fluidics Corporation, Columbia, MD (US)

( * ) Notice: Subject to any disclaimer, the term of this patent is extended or adjusted under 35 U.S.C. 154(b) by 263 days.

(21) Appl. No.: 10/372,597

(22) Filed: Feb. 24, 2003

(65) Prior Publication Data

US 2003/0234303 A1 Dec. 25, 2003

Related U.S. Application Data

(60) Provisional application No. 60/390,294, filed on Jun. 20, 2002.

(51) Int. Cl.
*B05B 1/08* (2006.01)

(52) U.S. Cl. ............... 239/589.1; 239/284.1; 239/590.5; 239/592; 239/394; 239/255; 239/1; 239/101; 239/102.1; 239/11; 137/14; 137/809; 137/810

(58) Field of Classification Search .......... 239/592, 239/284.1, 590.5, 589.1, 394
See application file for complete search history.

(56) References Cited

U.S. PATENT DOCUMENTS

| | | | |
|---|---|---|---|
| 3,423,026 A | 1/1969 | Carpenter | 239/284 |
| 4,157,161 A | 6/1979 | Bauer | |
| 4,185,777 A * | 1/1980 | Bauer | 239/394 |
| 4,210,283 A * | 7/1980 | Stouffer et al. | 239/11 |
| 4,390,128 A | 6/1983 | Fujikawa | |
| 4,508,267 A | 4/1985 | Stouffer | |
| 4,516,289 A | 5/1985 | Sumerau | |
| 4,520,961 A * | 6/1985 | Hueber | 239/284.1 |
| 5,074,471 A | 12/1991 | Baumgarten et al. | |
| 5,636,794 A * | 6/1997 | Hess et al. | 239/284.1 |
| 5,749,525 A | 5/1998 | Stouffer | |
| 5,845,845 A * | 12/1998 | Merke et al. | 239/1 |
| 5,906,317 A * | 5/1999 | Srinath | 239/284.1 |
| 5,971,301 A | 10/1999 | Stouffer et al. | |
| 5,975,431 A | 11/1999 | Harita et al. | |
| 6,062,491 A * | 5/2000 | Hahn et al. | 239/284.2 |
| 6,082,636 A | 7/2000 | Yoshida et al. | |
| 6,186,409 B1 * | 2/2001 | Srinath et al. | 239/1 |
| 6,253,782 B1 * | 7/2001 | Raghu | 137/14 |
| 6,354,515 B1 * | 3/2002 | Matsumoto et al. | 239/284.1 |
| 6,360,969 B1 * | 3/2002 | Egner-Walter et al. | 239/284.1 |
| 6,508,414 B1 * | 1/2003 | Matsumoto et al. | 239/284.1 |
| 6,739,521 B1 * | 5/2004 | Bandemer et al. | 239/284.2 |
| 6,789,747 B1 * | 9/2004 | Kuch et al. | 239/284.1 |
| 2001/0019086 A1 | 9/2001 | Srinath et al. | 239/589.1 |
| 2004/0117937 A1 | 6/2004 | Maruyama et al. | 15/250.02 |

\* cited by examiner

*Primary Examiner*—David A. Scherbel
*Assistant Examiner*—James S. Hogan
(74) *Attorney, Agent, or Firm*—Larry J. Guffey

(57) ABSTRACT

A fluidic insert that receives fluid under pressure from a fluid inlet tube and generates a specified spatial distribution of the fluid exiting the insert includes: (1) a body member having top, bottom, front and rear outer surfaces, (2) top and bottom fluidic circuits located, respectively, at least partially within the member's top and bottom surfaces, wherein each of these circuits has at least one power nozzle, an interaction chamber, and an outlet whose exit lies within the member front surface, (3) the bottom fluidic circuit having a portion of its surface area located upstream of the power nozzle and adapted so that it can mate with a fluid inlet tube that supplies fluid to the insert, and (4) an inter-circuit flow passage that allows fluid to flow from the bottom fluid circuit to the top fluid circuit, the bottom end of this passage located such that it is downstream of the point where the inlet tube mates with the bottom circuit and upstream of the bottom circuit's power nozzle, with the top end of this passage located upstream of the top circuit's power nozzle.

45 Claims, 15 Drawing Sheets

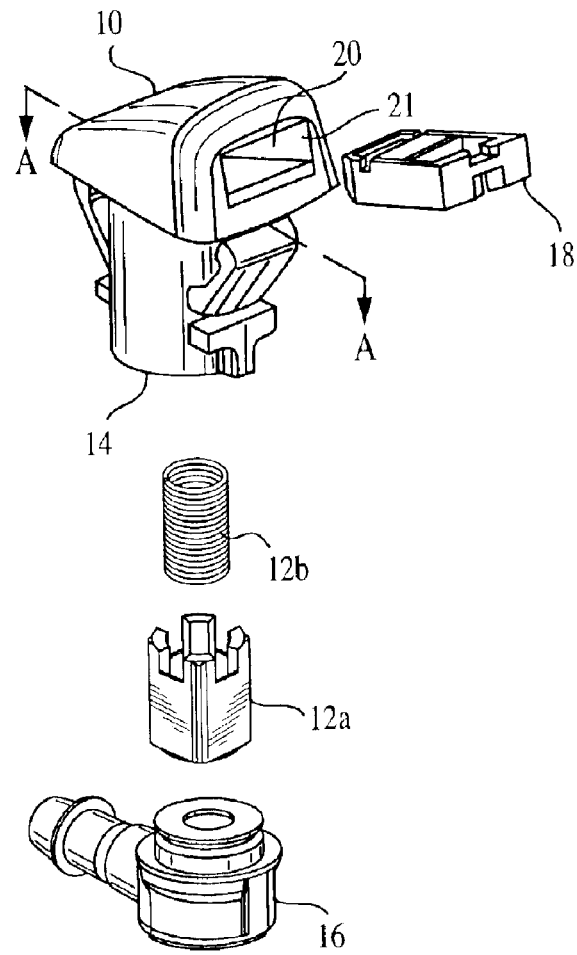
FIG. 1
AA: Cross-sectional View of Check Valve Within Housing
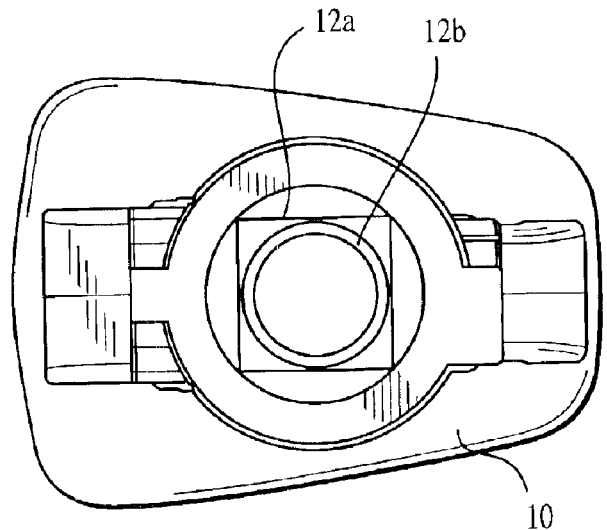

SECTION A-A

SECTION A-A

VIEW B

SECTION A-A

VIEW B

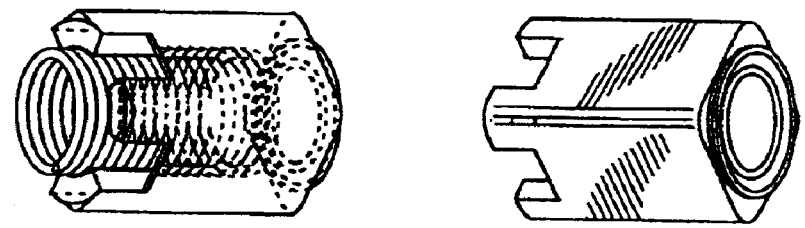
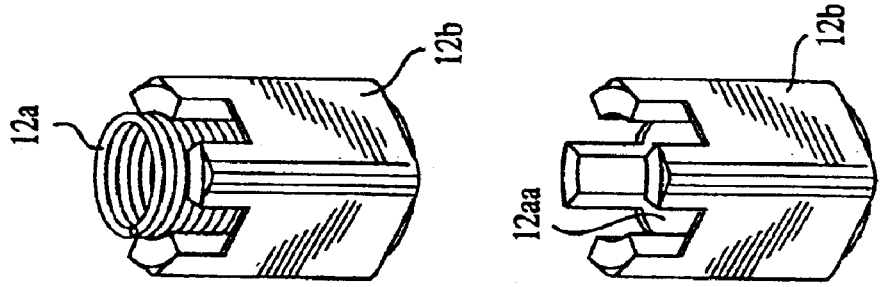
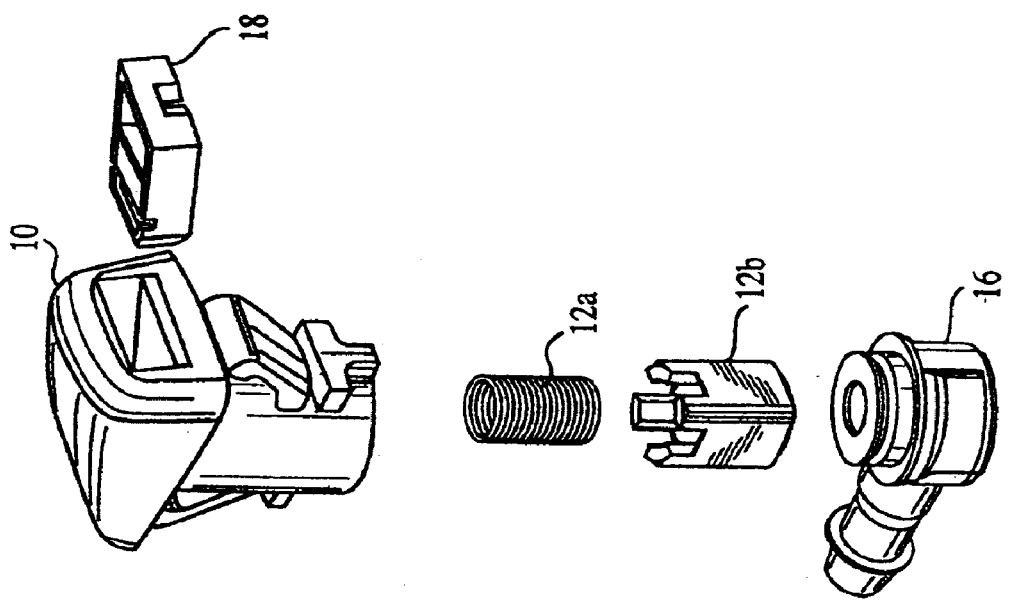
FIG. 14(b)
FIG. 14(a)

MULTIPLE SPRAY DEVICES FOR AUTOMOTIVE AND OTHER APPLICATIONS

CROSS-REFERENCE TO RELATED APPLICATION

This application claims the benefit of Provisional Patent Application No. 60/390,294, filed Jun. 20, 2002 by Keith Berning, Dan Steerman, Srinivasaiah Sridhara and Eric W. Koehler. The teachings of this application are incorporated herein by reference to the extent that they do not conflict with the teaching herein.

BACKGROUND OF THE INVENTION

1. Field of the Invention

This invention relates to fluid handling processes and apparatus. More particularly, this invention relates to a fluid flow device that is suitable for use in liquid-gas applications such as the distribution of cleaning fluids to wash automotive windshield, headlamp and rear windshield surfaces.

2. Description of the Related Art

Automotive windshield, headlamp and rear windshield cleaning applications need an optimum distribution of cleaning fluid spread over the critical areas to be cleaned in order for adequate cleaning to be accomplished, with or without the aid of wiper action. This task of achieving uniform distribution of cleaning fluid has not been easy for a number of reasons, including the complexity and changing nature of such automotive surfaces. Over the years, automotive designs have involved varying shapes, sizes and inclinations of the windshields and headlamps.

Reference may be made to some examples from the prior art devices for such automotive cleaning tasks. These are reported in U.S. Pat. Nos. 5,975,431 to Harita et al., U.S. Pat. No. 6,354,515 to Matsumoto & Tamano, and U.S. Pat. No. 6,082,636 to Yoshida et al. and others that involve various single orifice, washer nozzles that issue steady jets of liquids into gaseous environments. Nozzles such as these all have potential problems with uniformity of the distribution of cleaning fluid since they all have sprays emitted from the nozzles that impinge on limited area of the glass and then depend on the wiper to spread the fluid. In some cases, puddling of fluid can occur and result in wiper blade lifting. In other instances, there may not be enough wetting of the surfaces before a wiper sweeps across the surface to complete the cleaning process. In still other situations, nonuniformity of spray distributions result when the spray does not impact on the targeted areas due to the spray's interactions with the air passing around a moving vehicle.

This situation has been substantially improved in recent years by using several types of spray nozzles that issue spatially oscillating, rather than steady, jets of liquids into gaseous environments. Spray nozzles of this type are referred to herein as being "fluidic" nozzles. The improvements they provide center around the fact that the centerlines of the sprays that issue from them oscillate from side to side so that their sprays wet a much larger surface area than can be wetted by the spray from a non-oscillating, steady jet. See U.S. Pat. Nos. 4,508,267 and 5,749,525 to Stouffer, U.S. Pat. No. 5,971,301 to Stouffer & Heil, U.S. Pat. No. 6,186,409 to Srinath and U.S. Pat. No. 6,253,782 to Raghu.

Such fluidic nozzles have been very successful in a wide variety of cleaning applications, including automotive. This success is due to the nature of the sprays issuing from such nozzles—they are oscillating sprays or jets of fluid that sweep back and forth, and which can cover a wide area of the automotive glass to achieve uniform cleaning fluid distribution and prewetting of the to-be-cleaned surface.

Also, such fluidic nozzles can be engineered to yield some unique capabilities. For example, they can be engineered to yield spray drop distributions that have significantly larger-size, fluid drops than conventional nozzles. These larger size drops allow the targeted areas to be more quickly wetted than with conventional nozzles, providing such fluidic nozzles with improved high-speed, cleaning performance. However when such sprays are aimed higher to compensate for the spray depression occurring at high speeds, overspray over the sides may result. These nozzles can also be engineered to provide sprays having specified, nonuniform fluid droplet distributions (e.g., sprays having a larger percentage of their droplets near the outer edges of the spray's distribution).

U.S. Pat. No. 6,062,491 to Hahn combines two fluid nozzles into a single housing or stem that is mounted in front of an automotive surface to be cleaned. This combination yields two independently-operating, diverging fluid sprays that are reported to be capable of wetting a wider surface area. Such combinations of fluid nozzles into a single housing for cleaning purposes are also seen in U.S. Pat. No. 4,185,777 to Bauer, (see elements 31 and 40 in FIG. 3), U.S. Pat. No. 4,390,128 to Fujikawa (see FIG. 3A), U.S. Pat. No. 4,516,288 to Fizyta (see element 22 in FIG. 1), and U.S. Pat. No. 4,520,961 to Haeber (see FIG. 5).

Experiments with the invention of Hahn using various fluidic nozzles have revealed several problems whose solutions are not disclosed in Hahn's U.S. Pat. No. 6,062,491. These include fluid leakage problems around the fluidic chips that are inserted into automotive housings of the kind that are used to mount single fluidic nozzle for automotive windshield, headlamp and rear windshield cleaning applications. This result is not surprising since it is well known in the fluidic nozzle industry that sealing the housings around such nozzle inserts can be problematic, especially when the sealing task is compounded by having twice as much surface area to seal due to a second chip having been molded into the nozzle insert. Because of the comparatively high fluid pressures desired to be used in such dual, fluidic nozzle configurations, such chips have been actually spit from their housings due to the large pressures built up on the surface of the nozzles.

Thus, despite the prior art, there still exists a continuing need for fluid nozzles that can provide a desired distribution of fluid over larger surface areas.

3. Objects and Advantages

There has been summarized above, rather broadly, the prior art that is related to the present invention in order that the context of the present invention may be better understood and appreciated. In this regard, it is instructive to also consider the objects and advantages of the present invention.

It is an object of the present invention to provide an improved fluidic spray device that utilizes multiple nozzles in a single housing to provide a desired distribution of fluid over a large surface area.

It is another object of the present invention to provide such an improved fluidic spray device without having this device have the magnitude of fluid leakage problems that are currently associated with such devices.

It is yet another object of the present invention to provide such an improved fluidic spray device that is easy to manufacture and install in its required housing.

It is still another object of the present invention to provide such an improved fluidic spray device that is especially well suited for uniformly distributing cleaning fluids to wash automotive windshield, headlamp and rear windshield surfaces.

It is an object of the present invention to provide an improved fluidic spray device that will eliminate the problem of the sprays from current fluidic nozzles being swept over the hoods and the sides of cars that are traveling at high speeds.

These and other objects and advantages of the present invention will become readily apparent as the invention is better understood by reference to the accompanying summary, drawings and the detailed description that follows.

SUMMARY OF THE INVENTION

Recognizing the need for the development of improved fluidic spray devices that utilize multiple nozzles in a single housing to provide a desired spray distribution, the present invention is generally directed to satisfying the needs set forth above and overcoming the disadvantages identified with prior art devices and methods.

In accordance with the present invention, the foregoing need can be satisfied by providing a fluidic insert that in a preferred embodiment is comprised of the following elements: (1) a body member having top, bottom, front and rear outer surfaces, (2) top and bottom fluidic circuits located, respectively, at least partially within the member's top and bottom surfaces, wherein each of these circuits has at least one power nozzle, an interaction chamber, and an outlet whose exit lies within the member front surface, (3) the bottom fluidic circuit having a portion of its surface area located upstream of the power nozzle and adapted so that it can mate with a fluid inlet tube that supplies fluid to the insert, and (4) an inter-circuit flow passage that allows fluid to flow from the bottom fluid circuit to the top fluid circuit, the bottom end of this passage located such that it is downstream of the point where the inlet tube mates with the bottom circuit and upstream of the bottom circuit's power nozzle, with the top end of this passage located upstream of the top circuit's power nozzle.

In another preferred embodiment, the present invention takes the form of a fluidic device. Its elements include: (1) the fluidic insert described above, (2) a housing having a cavity configured to receive the fluidic insert, with the cavity having surfaces adapted to mate with a portion of the outer surfaces of the insert so as to prevent fluid leakage from these mated surfaces, the housing also having a housing tube that allows fluid to flow from an inlet at the lower end of the tube and into the cavity, (3) a check valve that is located within the housing tube, and (4) an elbow that connects to the lower end of the housing tube.

Thus, there has been summarized above, rather broadly, the present invention in order that the detailed description that follows may be better understood and appreciated. There are, of course, additional features of the invention that will be described hereinafter and which will form the subject matter of any eventual claims to this invention.

BRIEF DESCRIPTION OF THE DRAWINGS

FIG. 1 shows a preferred embodiment of the present invention.

FIGS. 14(a)–(b) illustrate a preferred embodiment of the check valve for use with the present invention.

DESCRIPTION OF THE PREFERRED EMBODIMENT

Figure 2A:
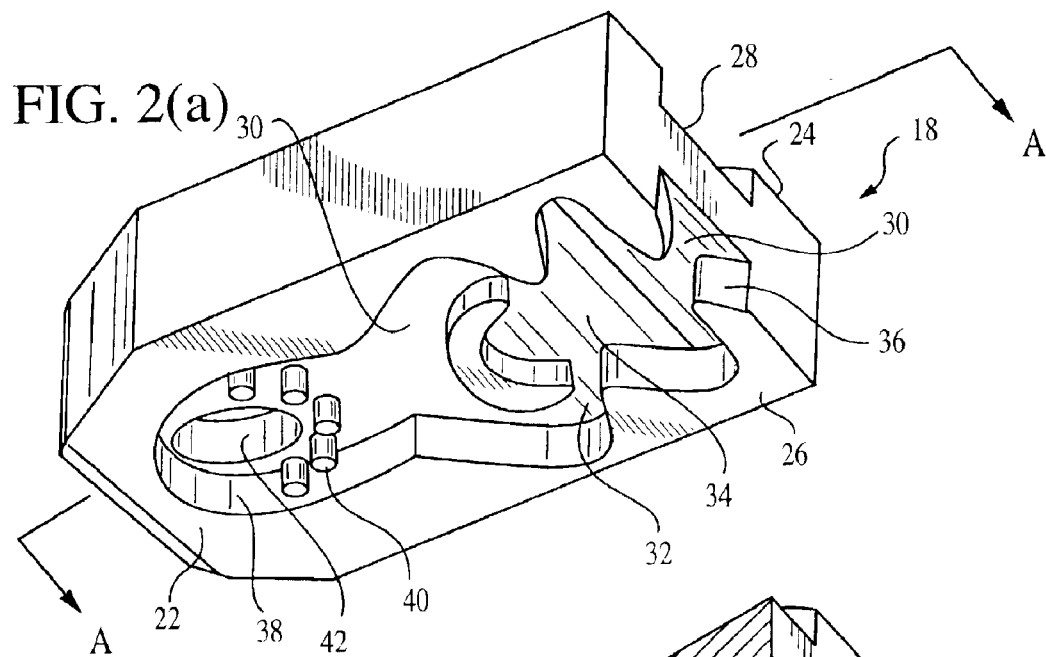
FIGS. 2(a)–(c) shows a preferred embodiment for a fluidic insert of the present invention which has two circuits of the "mushroom oscillator" type.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

A preferred embodiment of the fluidic device of present invention is shown in FIG. 1. It is seen to consist of: (a) an automotive housing 10 of the type that is conventionally used to mount and align fluidic nozzles to clean windshields, (b) a check valve 12, consisting of a uniquely designed piston 12a and a spring 12b, which connects at the check valve's downstream end to the inlet of the housing flow tube 14, and at its upstream end to an elbow 16 which directs fluid into the check valve, and (c) a fluid flow insert 18 that is inserted into a cavity 20 that has been especially configured in the housing so as to receive the insert and form a fluid-tight seal around the insert. Also shown in FIG. 1 is a cross-sectional view of the interior surface of the housing where the tops of the four posts of the piston contact the housing's interior surface.

Figure 2B:
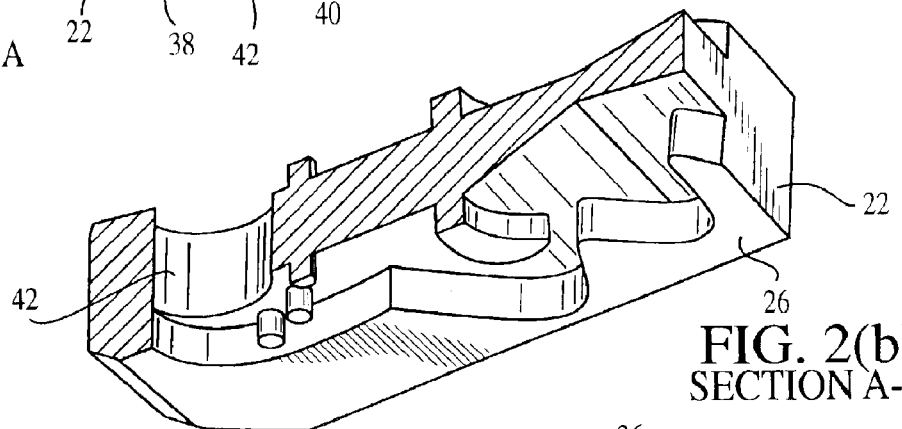
Figure 2C:
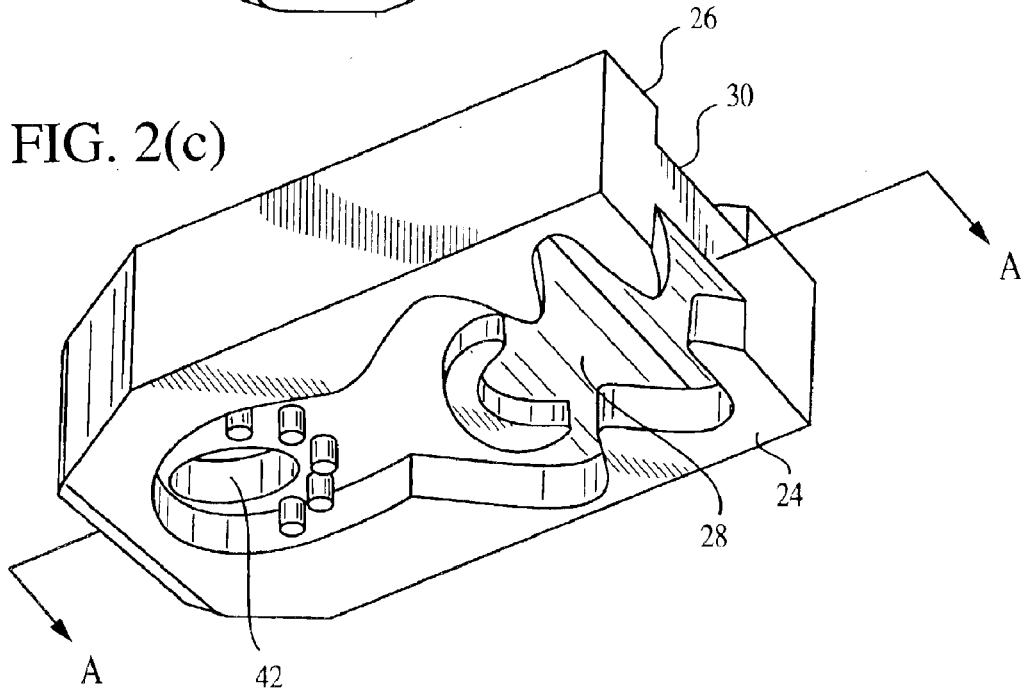

FIGS. 2(a)–(c) shows a preferred embodiment for a flow insert that is suitable for use with the present invention. This insert 18 is of the fluidic or oscillating type and includes a substantially rigid body member 22 having a top 24 and a bottom 26 outer surface. This member is preferably molded or fabricated from plastic, which is slightly deformable when subjected to compression forces exerted substantially normal to its outer surfaces. Fluidic circuits 28, 30 are fabricated respectively into the top and bottom outer surfaces. These circuits take the form of flow passages that are recessed from the respective top and bottom surfaces and molded into the member 22 so as to yield predetermined flow paths for the fluid flowing through the inserts.

There are many different and well known designs of fluidic circuits that are suitable for use with the fluidic inserts of the present invention. Many of these have some common features, including: at least one power nozzle 32 configured to accelerate the movement of the liquid that flows under pressure through the insert, an interaction chamber 34 through which the liquid flows and in which the fluid flow phenomena is initiated that will eventually lead to the flow from the insert being of an oscillating nature, and an outlet 36 from which the liquid exits the insert. The fluidic circuits of FIG. 2 are somewhat unique in that they have filter posts 40 that are located upstream of the power nozzles. The purpose of these posts is to filter any larger diameter debris particles that are contained in the liquid flowing through the insert before these particles clog either the downstream power nozzles or the circuit's outlet.

The inserts of the present invention also have an inter-circuit flow passage 42. This passage serves to allow liquid to flow from the bottom fluidic circuit 30, which is fed by flow from the housing's feed tube, to the insert's top fluidic circuit 28 at a point upstream of the circuits' power nozzles.

In one embodiment of the present invention, this flow passage is aligned so that it lies directly above the centerline 43 of where the housing's feed tube mates with the insert's bottom surface so as to allow liquid to flow into the insert's bottom circuit. Such a passage location presumably provides for a minimum pressure differential between the driving forces in the top and bottom fluidic circuits. See FIG. 3 which demonstrates a fluidic insert being inserted into the housing's cavity.

Figure 3:
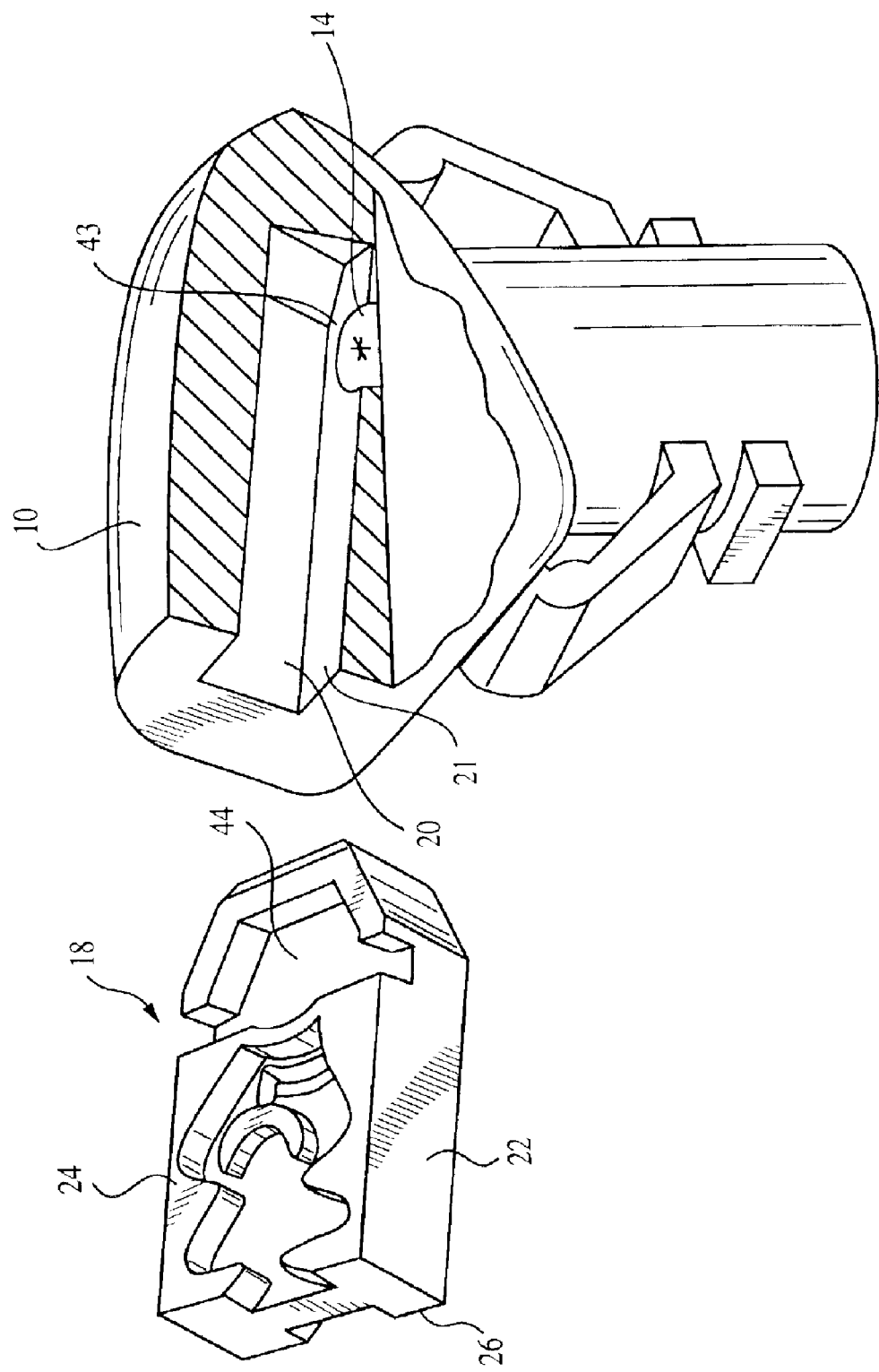
FIG. 3 shows a fluidic insert is aligned for insertion into the housing's cavity.
Figure 4C:
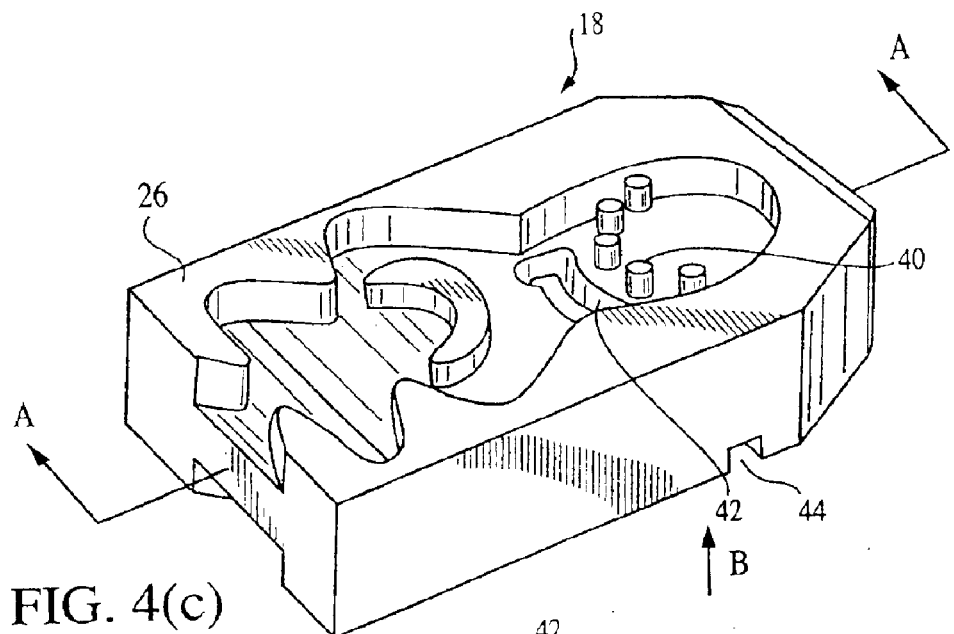
FIGS. 4(a)–4(c) show a fluidic insert which has its inter-circuit flow passage located at a downstream point that is closer to the power nozzles and which now has sufficient free surface area on the insert's top side to allow for the inclusion of an alignment slot and sites for contact with a molding machine's ejector pins.
Figure 4B:
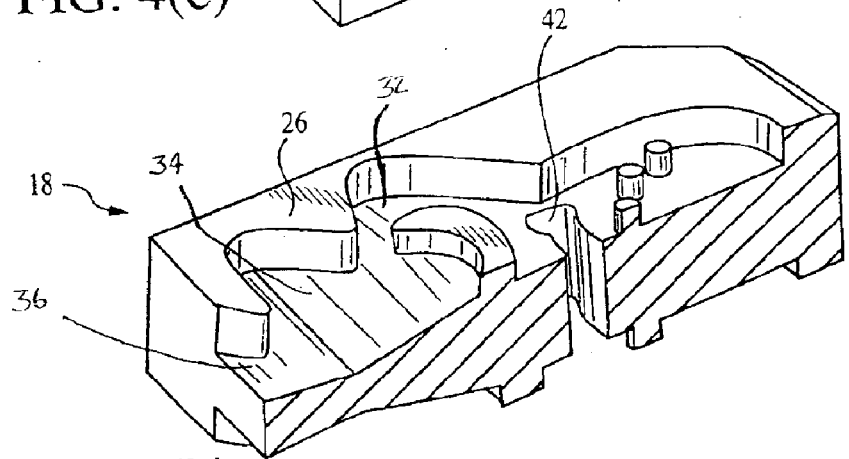
Figure 4A:
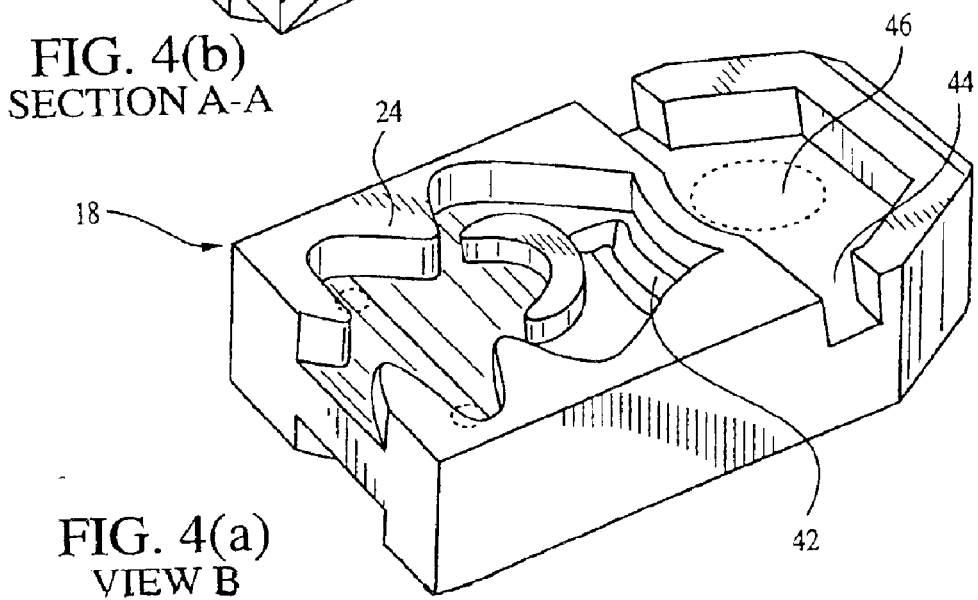

FIGS. 4(a)–4(c) show a top (a), a cross-sectional (b) and a bottom (c) view of a fluidic insert which, like that shown in FIG. 3, has a preferred, alternative location for the insert's inter-circuit flow passage 42. In this embodiment, this flow passage 42 is seen to not be aligned with the centerline of where the housing's feed tube mates with the insert's bottom surface. Rather, it is located at a downstream point that is closer to the power nozzles 32. The advantage of this location is seen in the ease with which such inserts may be molded and manufactured. Additionally, this location makes it possible to filter the fluid passing thru the insert by placing a filtering means, such as the appropriately spaced posts shown in FIG. 4, in only the bottom fluidic circuit.

For example, in the manufacture of such fluidic devices, it is advantageous to have a slot or groove 44 on the fluidic insert that can be used by the device's assembly machinery to grasp and align the fluidic insert 18 when it is being inserted into its housing (i.e., provides an error proof way to ensure the proper orientation of the inserted fluidic). Also, in the process of molding these inserts it is advantageous to have certain large surface area regions 46 on the outer surfaces of the insert where the relatively large, ejector pins of the molding equipment can make contact with the insert without getting in the way of the fluidic circuits that share the insert's outer surface.

For fluidic inserts that contain a fluidic circuit on only the bottom side 26 of the insert 18, this need for an alignment slot and ejector pin contact sites is not a problem since these may be located on the top side of the fluidic insert. However, with the dual circuit insert shown in FIG. 2, this is a problem since the fluidic circuit on the top side of the insert consumes a significant part of the surface area of the top side.

FIG. 4 shows that, for an insert 18 which has its inter-circuit flow passage 42 located at a downstream point that is closer to the power nozzles 32, there is now sufficient free surface area on the insert's top side to allow for the inclusion of an alignment slot 44 and sites 46 for contact with a molding machine's ejector pins.

A wide range of fluidic circuits have been found to be useful in the present invention for providing adequate uniform fluid distribution over geometrically diverse surface areas. For example, various combinations of fluidic circuits can be used in a single fluidic insert.

Additionally, it has been found that in some applications for the inserts disclosed herein, it may be beneficial for these inserts to have multiple, fluid flow circuits that yield sprays which are not oscillatory in nature. The appropriate design for the steady state, flow circuits that be used in this application are found in the patent literature. These include combinations of various steady state sprays, including the so called "gourd type" (see U.S. Pat. No. 5,975,431), the "T-jet type" (see U.S. Pat. No. 6,354,515), and various single jet devices. Similarly, one of these steady state spray circuits can be used in combination with one of the fluidic circuits disclosed herein.

Figure 5A:
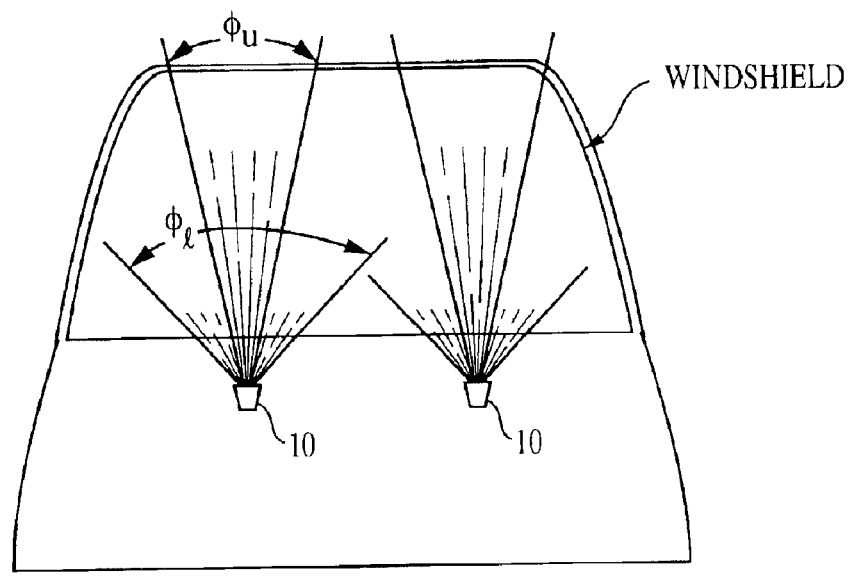
FIGS. 5(a)–5(b) demonstrate one of the spray patterns achievable on an automotive windshield using two preferred embodiments of the present invention that have dual, fluidic circuit inserts.
Figure 5B:
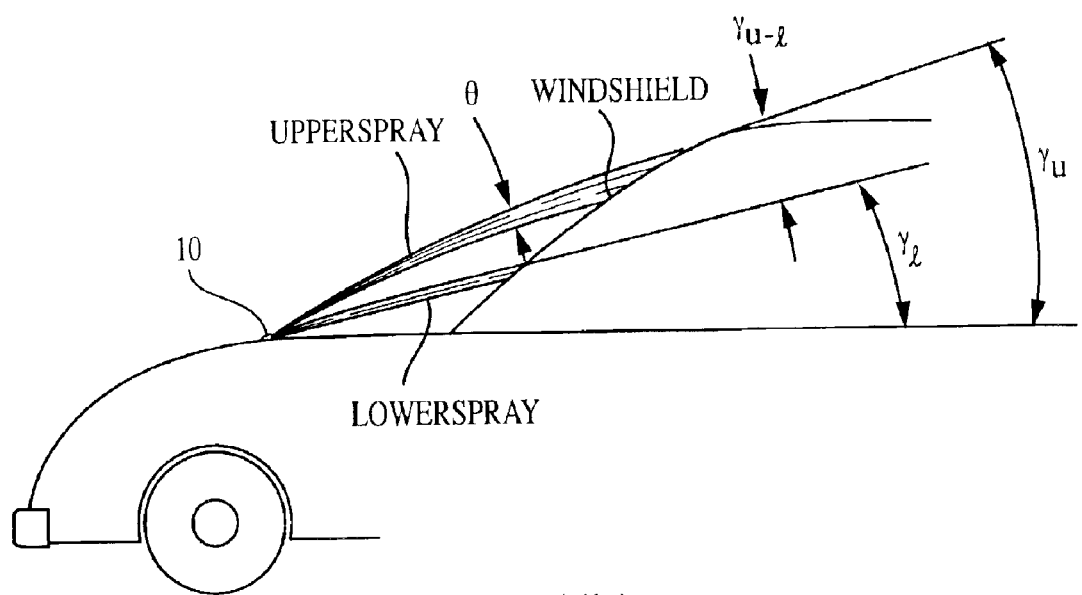

Such combinations have been found to allow for different liquid flow rates, fan angles, and spray alignments in the individual sprays of the various combinations. For example, FIGS. 5(a) and 5(b) demonstrate the type of spray distribution that can be achieved on an automotive windshield when two washer housings are mounted on an automobile's hood, with each of these housings contain a fluidic insert that has different fluid circuits embedded in its top and bottom surfaces. The upper fluidic circuit 28 in the insert 18 is seen to issue a smaller, horizontal, fan angle spray, $\phi_u$, while the lower fluid circuit 30 issues a larger, horizontal, fan angle, $\phi_l$.

These sprays are also seen to have centerlines that are definable in terms of their orientations above a horizontal plane located in the plane of the housing. The upper spray centerline defines a vertical spray angle $\gamma_u$, while the lower spray centerline defines a vertical spray angle $\gamma_l$, with the included vertical angle between these spray centerlines being defined as $\gamma_{u-l}$. In addition to their centerlines, such sprays can be characterized by the amount of vertical spread that is seen in a spray as it gets further from its point of origin on the insert's front face. We quantify this vertical spread as the "thickness" of the spray and define it by the angle of spread of the spray, $\theta$, see FIG. 5.

Because of the proximity of the centerlines of these sprays as they issue from the exits of their respective fluidic circuits, the dual fluidic inserts of the present invention provide heretofore unexplored opportunities for creating novel and efficient fluid flow phenomena which has many industrial applications. For example, for windshield and headlamp washer applications, extensive research was undertaken to identify specific fluidic circuits that would yield improved operational and windshield cleaning performance in the fluidic inserts of the present invention.

To wet a typical size, automotive windshield (i.e., 1,600 mm wide, 1,000 mm tall) using the present invention, two, double spray fluidic nozzles can be used, with each being mounted 280 mm from the windshield's centerline and 180 mm in front of the windshield. Each nozzle has a fluidic insert in which the flow paths of the top and bottom fluidic circuits (which are of the "mushroom" type, see U.S. Pat. No. 6,253,782) are angled away from each other so as to give a vertical included angle of 2–3 degrees in the resulting sprays, with each spray having a thickness of 1–2 degrees. These angles are seen to give sufficient spray spreading in the vertical direction so as to adequately wet the full heigth of this windshield.

For applications requiring greater spray spreading (e.g., the nozzles are to be mounted closer to the windshield, or the windshield is taller), it has been found that it is possible to place a "reverse" taper in the floor of these circuits to achieve spread or vertical included angles of 4–6 degrees. See U.S. Pat. No. 5,749,525 for a disclosure of such "reverse" taper, fluidic circuits.

For applications such as headlamp washers, much greater spray spreading angles (i.e., 10–20 degrees) are needed, along with better than the normal amount of wetting that is typically seen in the interaction region between the sprays. As a result of extensive experimentation using various embodiment of the present invention, a number of ways have been discovered for satisfying these needs. Some of the more pertinent of these are discussed and shown below.

Figure 6:
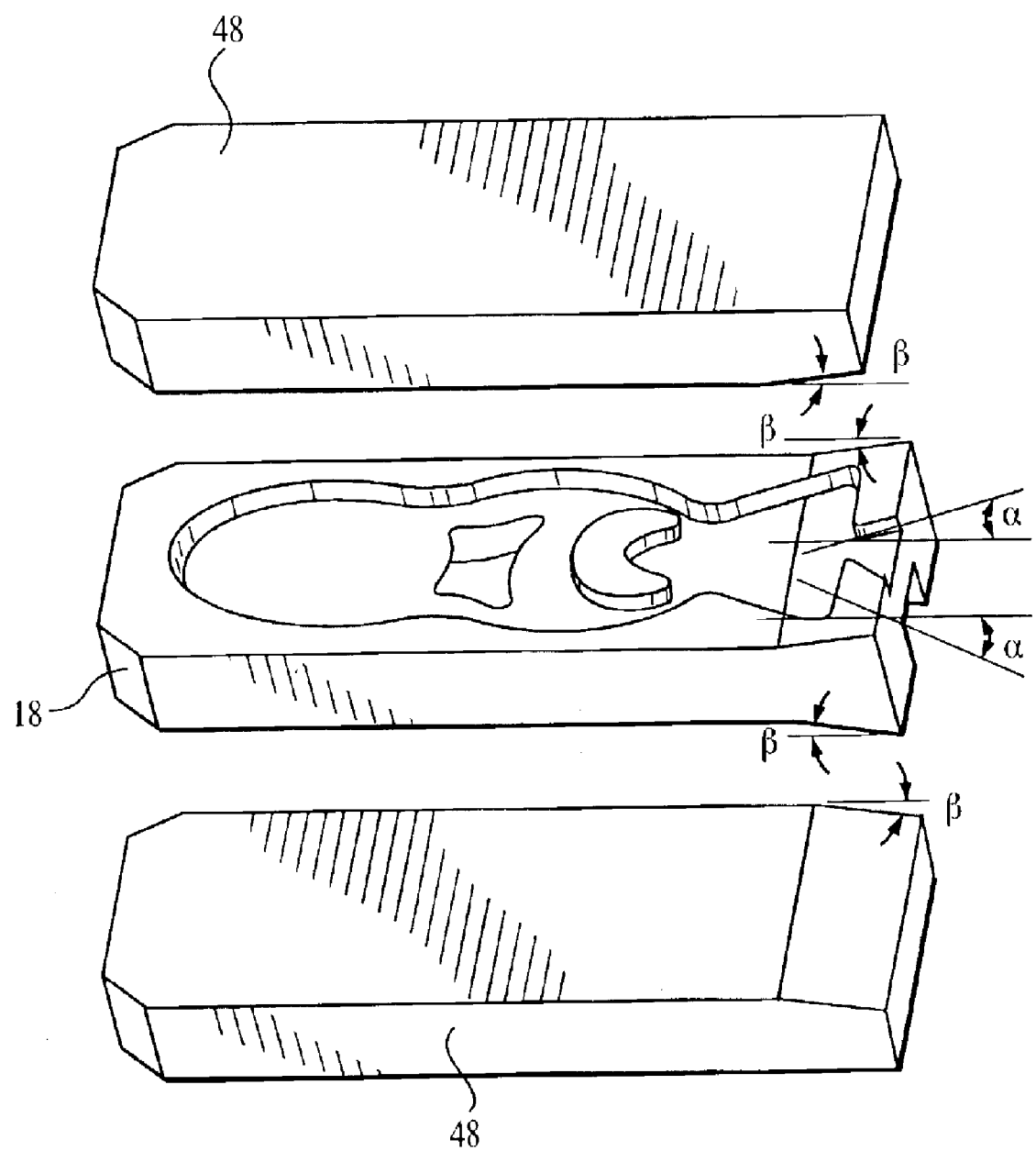
FIG. 6 illustrates a dual spray fluidic nozzle of the present invention which has top and bottom "mushroom" circuits and a "cover plate" applied to each circuit.

FIG. 6 illustrates a dual spray fluidic nozzle of the present invention which has top and bottom "mushroom" circuits and a unique type of "cover plate" applied to each circuit. The use of "cover plates," 48 commonly known as "fliptops," is generally disclosed in U.S. Pat. No. 5,845,845. For the present application, it was discovered that it is beneficial to provide a taper to the downstream end of these cover plates so as enhance the spreading of the sprays which issue from them. For a 9 degree taper in each cover plate and a similar 9 degree taper in the floors of the fluidic circuits near their exits, it was found that spray included angles of approximately 18 degrees could be achieved.

Figure 7:
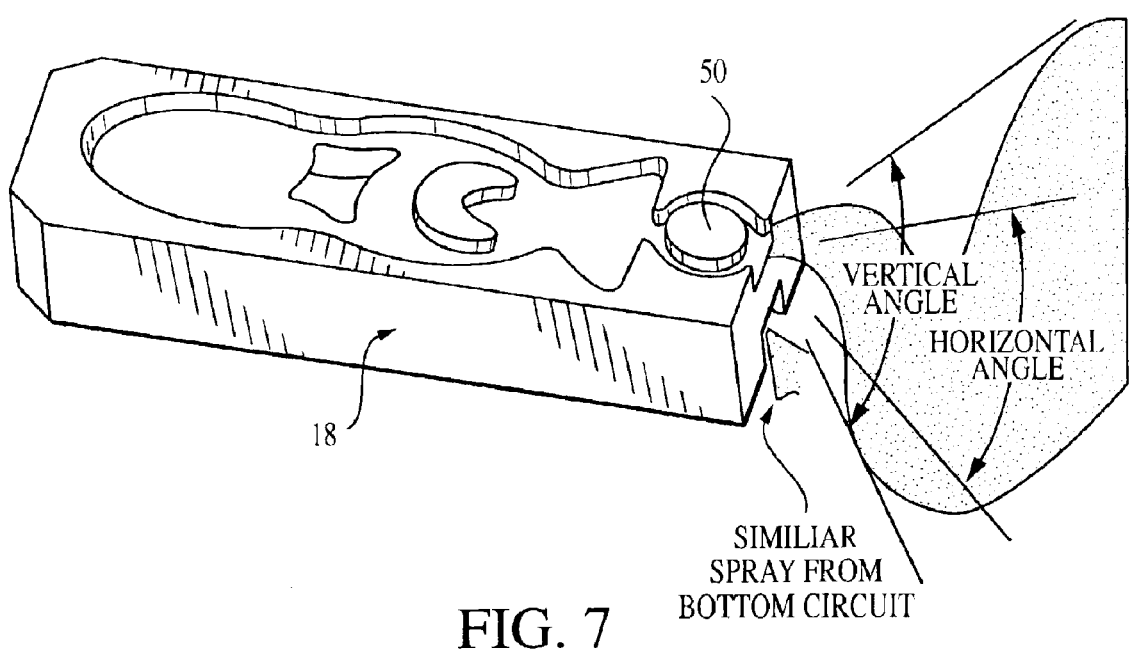
FIG. 7 illustrates a dual spray fluidic nozzle of the present invention which has top and bottom, "mushroom" type circuits which have a "second interaction chamber and an island" disposed downstream of the circuit's standard exit.

FIG. 7 illustrates another dual spray fluidic nozzle of the present invention which has top and bottom, "mushroom" type circuits which have a "second interaction chamber and an island" disposed downstream of the circuit's standard exit. The use of a fluidic circuit having a "second interaction chamber and an island" 50 is generally disclosed in U.S. Pat. No. 5,860,603. For the present application, it was discovered that the flow from this type of a circuit when placed in close proximity to the flow from an adjoining circuit yields significant interaction between the sprays that result in their rate of spreading being greatly enhanced. Spray included angles of up to 50 degrees have been achieved with these types of fluidic circuits being used in the present invention.

Figure 8A:
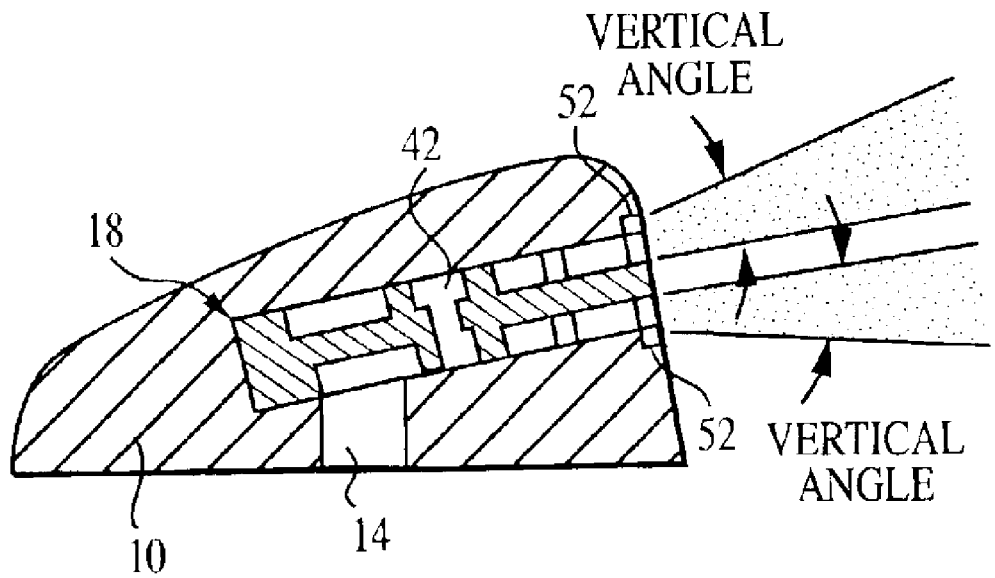
FIGS. 8(a)–(b) illustrate a dual spray fluidic nozzle of the present invention which has top and bottom circuits in which a notch or channel has been cut in a portion of the outer edge of the exits of each of these circuits.
Figure 8B:
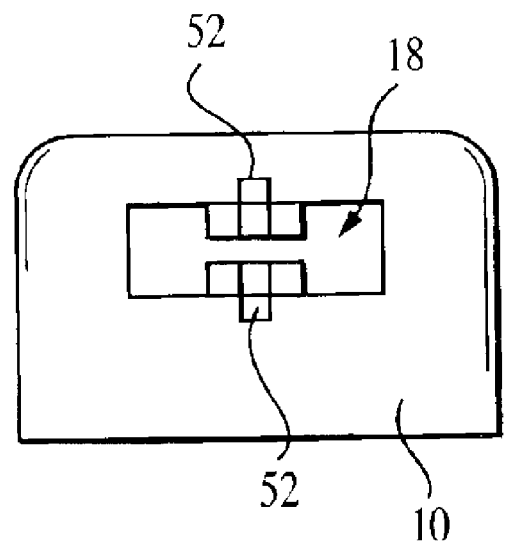

FIGS. 8(a)–(b) illustrate yet another dual spray fluidic nozzle of the present invention which has top and bottom circuits in which a notch or channel 52 has been cut in a portion of the outer edge of the exits of each of these circuits. It was discovered that these notches led to flow interactions which resulted in the spray's rate of spreading being increased. Spray included angles of 10–15 degrees have been achieved with such fluidic circuits in the present invention.

Figure 9:
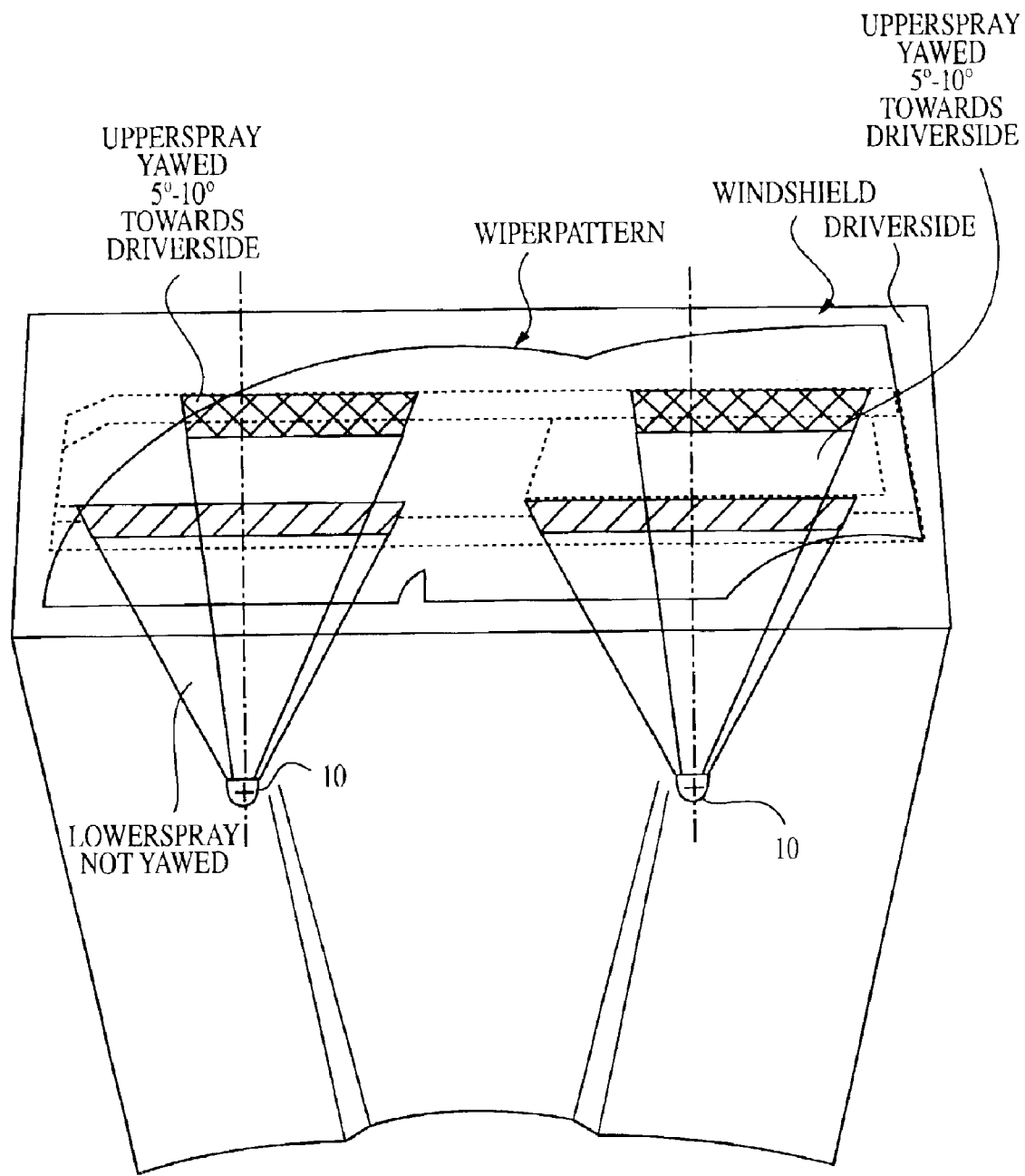
FIG. 9 illustrates a dual spray fluidic nozzle of the present invention for a windshield application and the spray pattern achieved by utilizing a "yawed" fluidic circuit in the top of the insert and a conventional fluidic circuit in the bottom of the insert.

In addition to providing greater, more diverse means for achieving improved wetting of targeted surfaces, the present invention also offers the means for achieving spatial distributions of spray patterns that are totally impossible with conventional, single spray nozzles. For example, FIG. 9 for a windshield application shows a spray pattern that has been achieved by utilizing the present invention with a "yawed" fluidic circuit in the top of the insert and a conventional fluidic circuit in the bottom of the insert. See U.S. Pat. No. 6,240,945 for a disclosure of such how one achieves such "yawed" fluidic circuits. In this application, the top spray is seen to have its centerline deflected (or "yawed") by approximately 5–10 degrees towards the driver's side of the windshield.

Figure 10A:
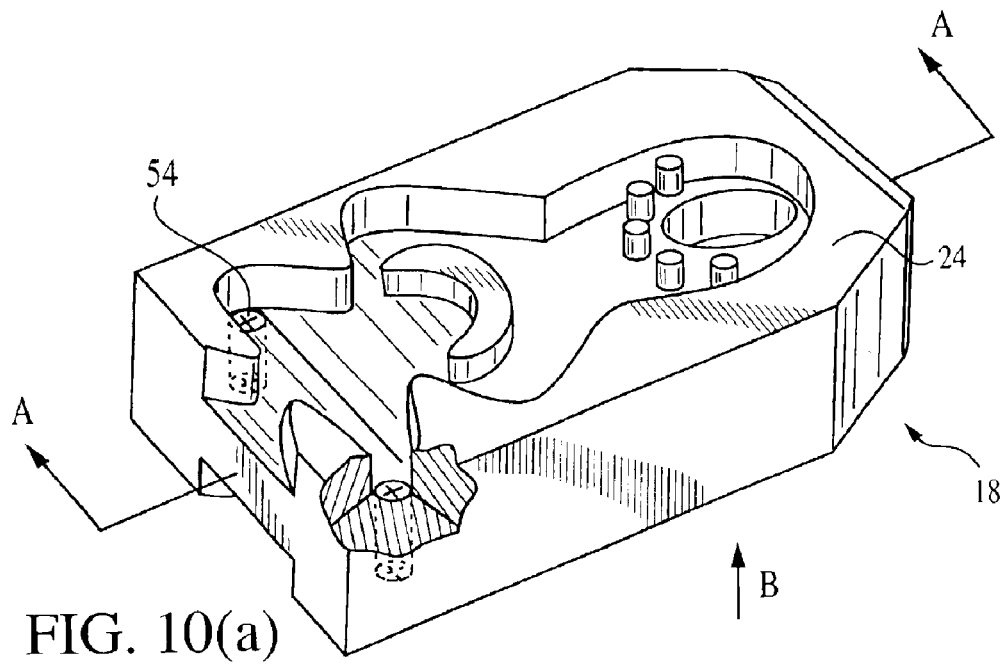
FIGS. 10(a)–(c) show a preferred embodiment for a fluidic insert of the present invention which has a linking passage between the interaction chambers of its upper and lower fluidic circuits.
Figure 10B:
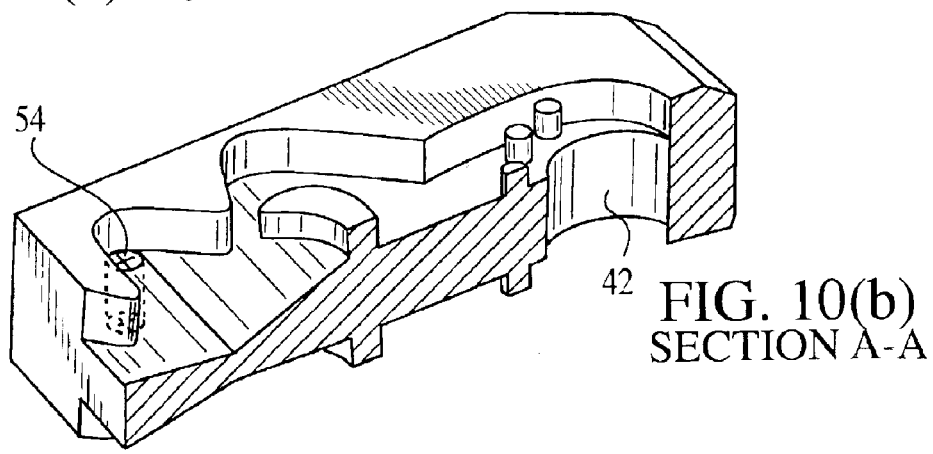
Figure 10C:
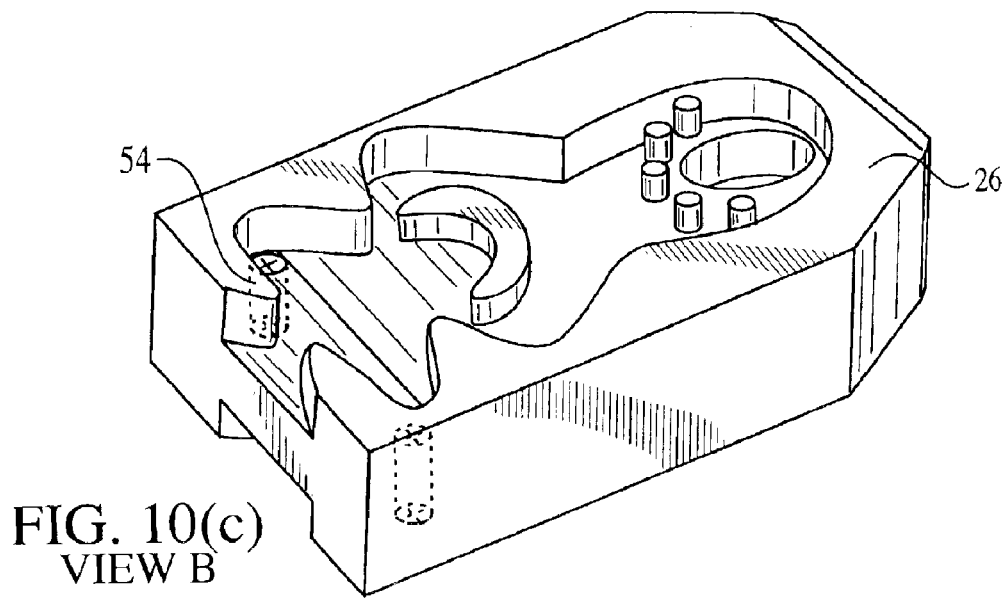
Figure 11A:
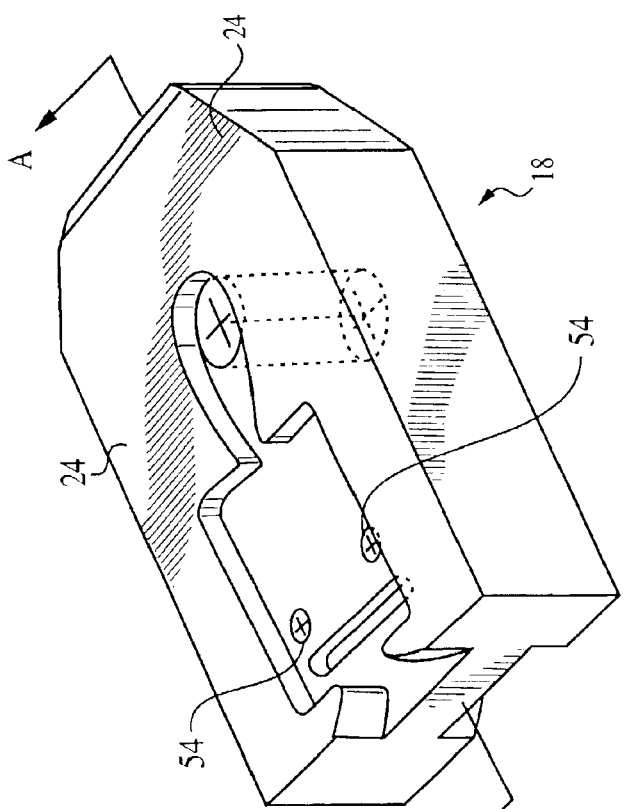
FIGS. 11(a)–(b) show preferred embodiments for a fluidic insert of the present invention which have linking passages between the interaction chambers of their upper and lower fluidic circuits.
Figure 11A:
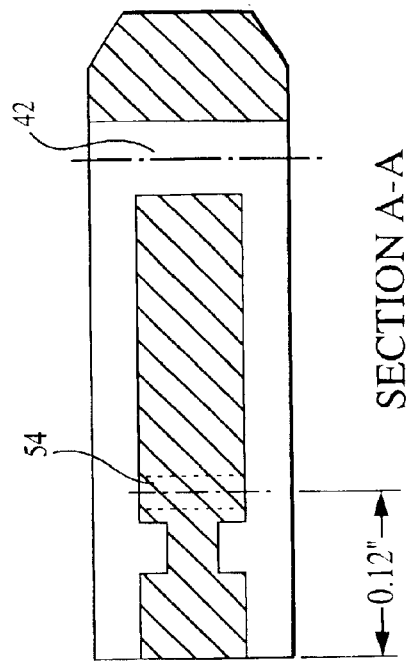
Figure 11B:
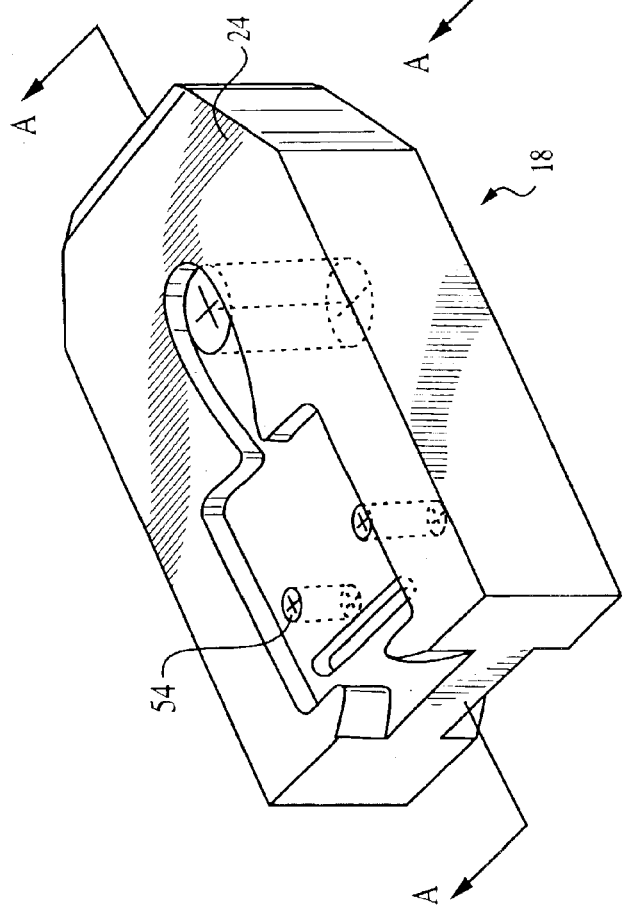
Figure 11B:
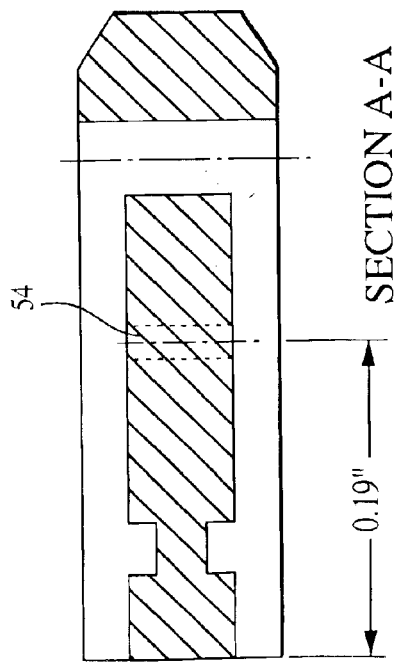

It has also been discovered that the types of spray patterns that can be achieved by such fluidic inserts can be further expanded by providing a linking passage 54 between the interaction chambers 34 of the upper 28 and lower 30 fluidic circuits, thereby allowing the flows within these chambers to interact. See FIGS. 10 and 11. This interaction has been found to yield oscillating spray distributions from the top and the bottom of the insert that can be synchronized so as to yield oscillating sprays that can be totally in-phase or totally out-of-phase. For example, tests of the fluidic insert shown in FIG. 11(b) reveal that its upper and lower sprays are totally in phase, while those of the insert shown in FIG. 11(a) are totally out-of-phase.

The problem of leakage in the prior art fluidic devices, especially those having inserts with multiple fluidic circuits, has been greatly reduced in the present invention by making a number of inventive modifications to these devices. For example, as a result of much experimentation, it was found that the use of polycarbonate-PBT plastic in making the fluidic inserts and the housing allowed for the fabrication of more precise mating surfaces between the fluidic insert's outer surface and the contact or sealing surfaces 21 of the housing's cavity. With the use of this plastic it was found that the propensity, in the parts molding process, for the creation of undesirable molding sinks is greatly reduced, especially in the contact surfaces of the housing's cavity.

Figure 12B:
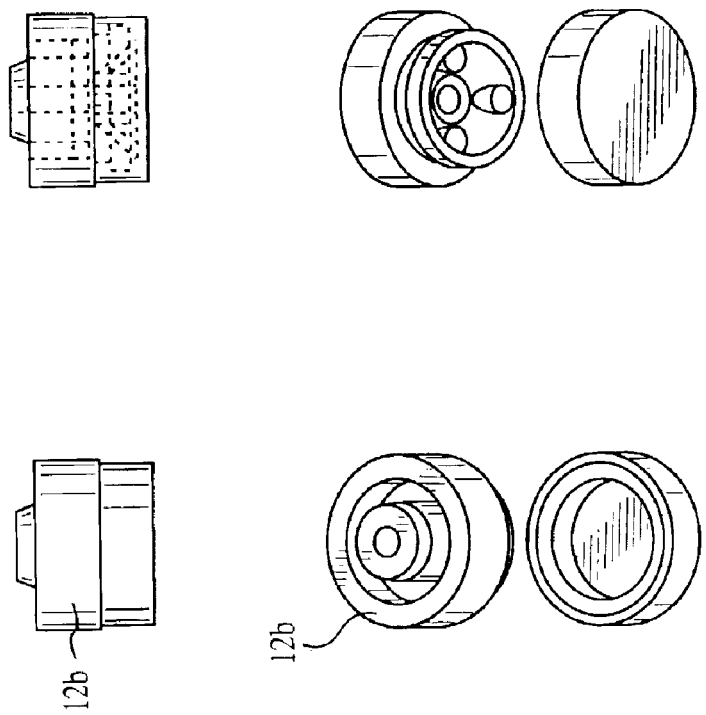
FIGS. 12(a)–(b) illustrate the prior art applicable to a check valve of the type that would have been considered for use with the present invention.
Figure 12A:
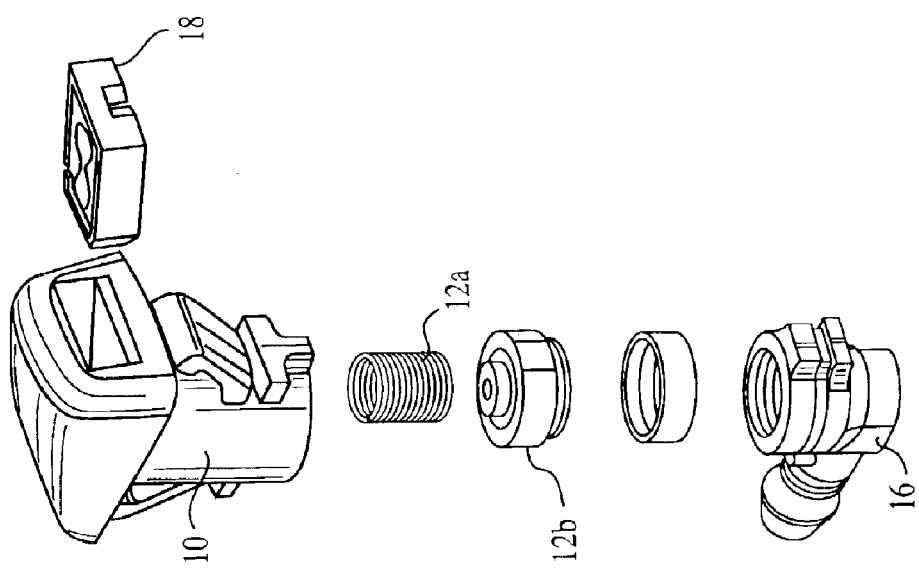
Figure 13B:
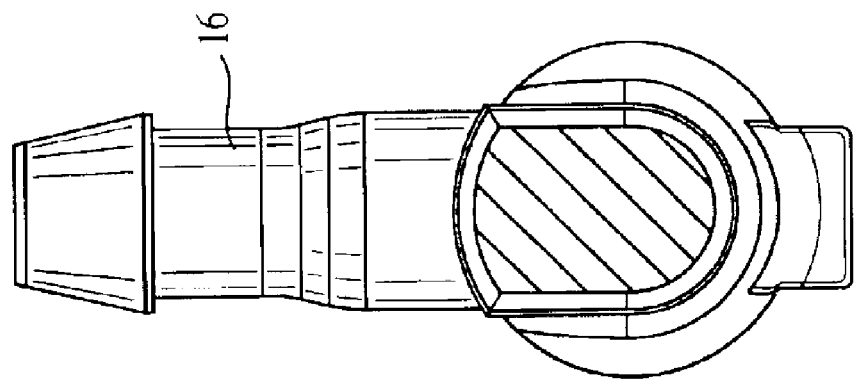
FIGS. 13(a)–(b) illustrate the prior art applicable to the mating surfaces of the housing and the elbow which come together to form the housing-elbow joint which surrounds the check valve which sits in the fluid passage which is partially formed by this joint.
Figure 13A:
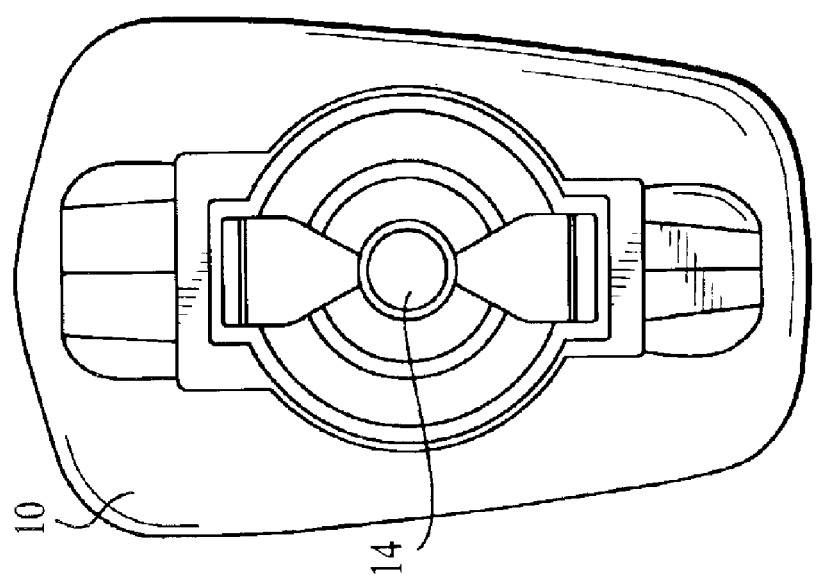
Figure 15B:
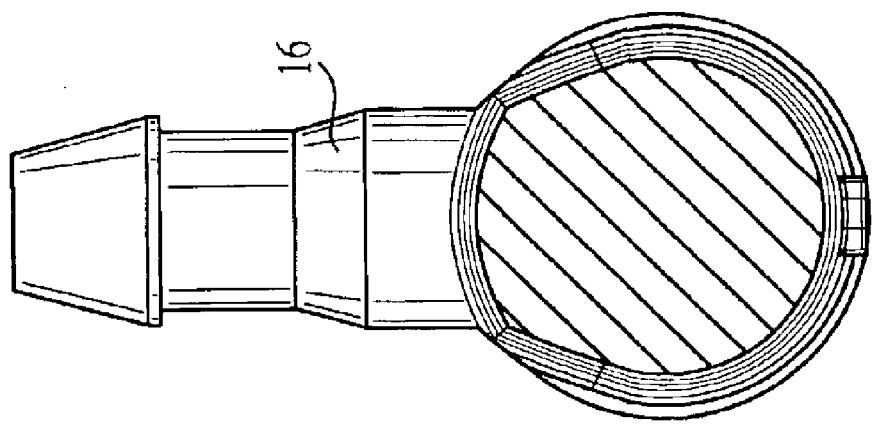
FIGS. 15(a)–(b) illustrate a preferred embodiment for the mating surfaces of the housing and the elbow which are suitable for use with the present invention.
Figure 15A:
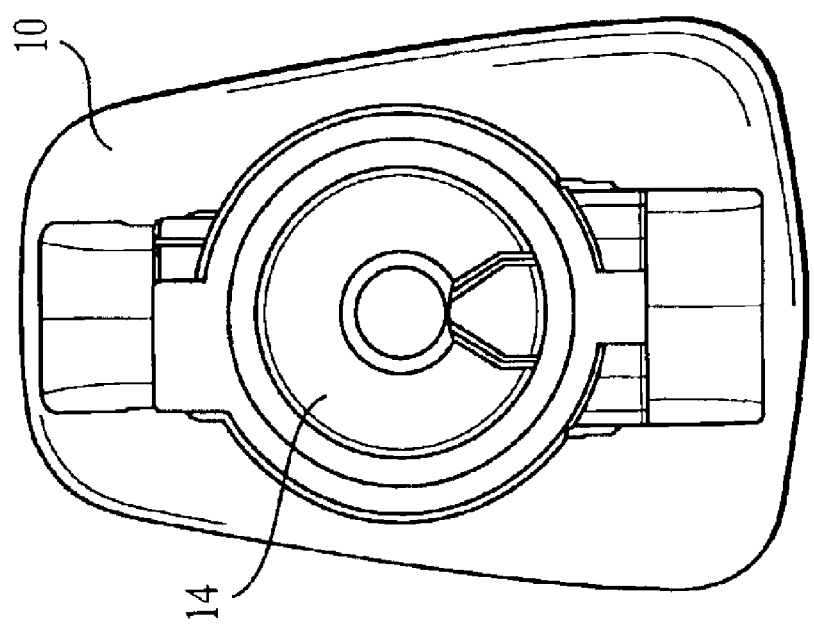

Additionally, it has been discovered that leakage around the check valve 12 and in the assembly joint between the housing and the elbow could be significantly reduced as a result of a redesign of the check valve and the portions of the housing 10 and elbow 16 that surround it. FIGS. 12(a)–(b) shows a sample of the prior art applicable to this area for an automotive housing which utilizes a fluidic insert having a fluidic circuit on only its bottom surface. In this prior art, the check valve is seen to consist of a spring, a piston and a seal. FIGS. 13(a)–(b) shows the contact or sealing or mating surfaces of the housing and the elbow which come together to form the housing-elbow joint which surrounds the check valve which sits in the fluid passage which is partially formed by this joint.

A preferred embodiment of the present invention's improvement in this area is shown in FIGS. 14(a)–(b) and FIGS. 15(a)–(b). The check valve 12 of the present invention is seen to make the task of assembling the spring-piston combination much simpler since the spring now sits in a cavity 12aa that has been configured in the top portion of the piston 12a to accommodate the spring 12b. Due to the configuration and favorable length to diameter ratio of this piston, the spring is retained within it with no cocking during assembly and welding.

By comparing FIGS. 13 and 15, it can be seen that the housing wall thickness of the present invention, compared to that shown in the prior art, is greater and the surfaces to be joined are flatter allowing for better welding. Additionally, the top of the top of the present invention is flat and larger in contact area than that of the prior art elbow shown in FIG. 12. This allows for better transfer of welding energy and greatly reduces the difficulty of welding these parts. Higher welding strength can be achieved in the parts of the present invention and the percentage of parts that have to be scrapped due to fabrication defects is greatly reduced. An additional improvement in the design of the present are the four fluid passages around the piston, instead of two in the prior check valve shown in FIG. 12, which results in fewer problems with valve clogging.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as hereinafter set forth in the claims.

We claim:

1. A fluidic insert that receives fluid under pressure from a fluid inlet tube and generates a specified spatial distribution of the fluid exiting said insert, said insert comprising:
   a member having top, bottom, front and rear outer surfaces,
   a top fluidic circuit located at least partially within said top surface,
   a bottom fluidic circuit located at least partially within said bottom surface,
   wherein each of said fluidic circuits having at least one power nozzle, an interaction chamber downstream of said nozzle, an outlet downstream from said interaction chamber with the exit from said outlet lying within said member front surface,
   said bottom circuit having a portion of its surface area located upstream of said power nozzle and adapted so that it can mate with a fluid inlet tube that supplies fluid to said insert, and
   an inter-circuit flow passage that allows fluid to flow from the bottom fluidic circuit to the top fluidic circuit, the bottom end of said passage located such that the bottom end is downstream of said point where said inlet tube mates with said bottom circuit and upstream of said bottom circuit power nozzle, the top end of said passage located upstream of said top circuit power nozzle.

2. A fluidic insert as recited in claim 1, further comprising:
   a linking passage that connects the interaction chambers of said circuits.

3. A fluidic insert as recited in claim 1, further comprising:
   an alignment means located in the top surface of said insert.

4. A fluidic insert as recited in claim 3, wherein the distance between the bottom end of said inter-circuit passage and said point where said inlet tube mates with said bottom circuit is adapted so as to accommodate the location of said alignment means in said top surface.

5. A fluidic insert as recited in claim 1, wherein:
   said insert is molded from plastic, and
   said distance between the bottom end of said inter-circuit passage and said point where said inlet tube mates with said bottom circuit is adapted so as to accommodate the location of contact points with the ejector pins that are used in molding said insert.

6. A fluidic insert as recited in claim 4, wherein:
   said insert is molded from plastic, and
   said distance between the bottom end of said inter-circuit passage and said point where said inlet tube mates with said bottom circuit is further adapted so as to accommodate the location of contact points with the ejector pins that are used in molding said insert.

7. A fluidic insert as recited in claim 1, wherein:
   said bottom fluidic circuit having a filter means located between said point where said inlet tube mates with said bottom circuit and said bottom circuit power nozzle.

8. A fluidic insert as recited in claim 5, wherein the plastic from which said insert is molded from a polycarbonate-PBT.

9. A fluidic device that receives fluid under pressure from a fluid inlet tube and generates a specified spatial distribution of the fluid exiting said device, said device comprising:
   a fluidic insert,
   a housing having a cavity configured to receive said fluidic insert, said cavity having surfaces adapted to mate with a portion of the outer surfaces of said insert so as to prevent fluid leakage from such mated surfaces, said housing having a housing tube that allows fluid to flow from an inlet at the lower end of said tube and into said cavity,
   wherein said insert having:
      a member having top, bottom, front and rear outer surfaces,
      a top fluidic circuit located at least partially within said top surface,
      a bottom fluidic circuit located at least partially within said bottom surface,
      wherein each of said fluidic circuits having at least one power nozzle, an interaction chamber downstream of said nozzle, an outlet downstream from said interaction chamber with the exit from said outlet lying within said member front surface,
      said bottom circuit having a portion of its surface area located upstream of said power nozzle and adapted so that it can mate with the top end of said housing tube that supplies fluid to said insert, and
      an inter-circuit flow passage that allows fluid to flow from the bottom fluid circuit to the top fluid circuit, the bottom end of said passage located such that the bottom end is downstream of said point where said top end of said housing tube mates with said bottom fluidic circuit and upstream of said bottom circuit power nozzle, the top end of said passage located upstream of said top circuit power nozzle.

10. A fluidic device as recited in claim 9, further comprising:
a check valve that is located within said housing tube.

11. A fluidic device as recited in claim 10, further comprising:
an elbow that connects to the lower end of said housing tube.

12. A fluidic device as recited in claim 9, further comprising:
a linking passage that connects the interaction chambers of said circuits.

13. A fluidic device as recited in claim 9, further comprising:
an alignment means located in the top surface of said insert.

14. A fluidic device as recited in claim 12, wherein the distance between the bottom end of said inter-circuit passage and said point where said inlet tube mates with said bottom circuit is adapted so as to accommodate the location of said alignment means in said top surface.

15. A fluidic device as recited in claim 9, wherein:
said insert is molded from plastic, and
said distance between the bottom end of said inter-circuit passage and said point where said inlet tube mates with said bottom circuit is adapted so as to accommodate the location of contact points with the ejector pins that are used in molding said insert.

16. A fluidic device as recited in claim 14, wherein:
said insert is molded from plastic, and
said distance between the bottom end of said inter-circuit passage and said point where said inlet tube mates with said bottom circuit is further adapted so as to accommodate the location of contact points with the ejector pins that are used in molding said insert.

17. A fluidic device as recited in claim 9, wherein:
said bottom fluidic circuit having a filter means located between said point where said inlet tube mates with said bottom circuit and said bottom circuit power nozzle.

18. A fluidic insert as recited in claim 13, wherein the plastic from which said insert is molded from a polycarbonate-PBT plastic.

19. A flow insert that receives fluid under pressure from a fluid inlet tube and generates a specified spatial distribution of the fluid exiting said insert, said insert comprising:
a body member having top, bottom, front and rear outer surfaces,
a first flow circuit located within said member,
a second flow circuit located within said member,
wherein each of said flow circuits having a nozzle, an outlet downstream from said nozzle with the exit from said outlet lying within said member front surface,
said second circuit having an inlet portion located upstream of said nozzle and adapted so that it can mate with a fluid inlet tube that supplies fluid to said insert, and
an inter-circuit flow passage that allows fluid to flow from the second flow circuit to the first flow circuit, the bottom end of said passage located such that the bottom end is downstream of said point where said inlet tube mates with said second circuit and upstream of said second circuit nozzle, the top end of said passage located upstream of said first circuit nozzle.

20. A flow insert as recited in claim 19, wherein said flow circuits are chosen from the group consisting of steady state flow circuits and fluidic circuits.

21. A flow insert as recited in claim 19, wherein said first flow circuit located at least partially within said member top surface, and said second flow circuit located at least partially within said member bottom surface.

22. A flow insert as recited in claim 19, further comprising:
an alignment means located in the top surface of said insert.

23. A flow insert as recited in claim 21, wherein:
said first flow circuit lies proximate said top surface of said body member and said second flow circuit lies proximate said bottom surface of said body member, and
said flow circuits further having a first interaction chamber located between said nozzle and outlet.

24. A flow insert as recited in claim 23, wherein:
said first flow circuit being configured so as to yield a spray having a specified horizontal fan angle, and
said second flow circuit being configured so as to yield a spray having a horizontal fan angle that is larger than that of said specified horizontal fan angle of said first flow circuit.

25. A flow insert as recited in claim 23, wherein:
said first flow circuit being configured so as to yield a spray having a specified horizontal fan angle, and
said second flow circuit being configured so as to yield a spray having a horizontal fan angle that is smaller than that of said specified horizontal fan angle of said first flow circuit.

26. A flow insert as recited in claim 23, wherein:
said flow circuits being configured so that the centerlines of said first and second flow circuits angle away from each other a specified amount so as to give a prescribed vertical included angle between the fluid sprays that flow from said circuits.

27. A flow insert as recited in claim 23, wherein:
the floor of said first flow circuit being configured proximate said outlet to have a reverse taper, and
the roof of said second flow circuit being configured proximate said outlet to have a reverse taper.

28. A flow insert as recited in claim 23, further comprising:
a top cover plate configured to cover and adjoin the roof of said first flow circuit, said plate having a taper in its thickness proximate said plate's downstream end.

29. A flow insert as recited in claim 23, further comprising:
a bottom cover plate configured to cover and adjoin the floor of said second flow circuit, said plate having a taper in its thickness proximate said plate's downstream end.

30. A flow insert as recited in claim 23, further comprising:
a top cover plate configured to cover and adjoin the roof of said first flow circuit, said plate having a taper in its thickness proximate said plate's downstream end, and
a bottom cover plate configured to cover and adjoin the floor of said second flow circuit, said plate having a taper in its thickness proximate said plate's downstream end.

31. A flow insert as recited in claim 23, wherein:
said flow circuits further having a second interaction chamber with an island, said second chamber being located downstream of said first interaction chamber and before said outlet.

32. A flow insert as recited in claim 23, wherein:
the roof portion of said first flow circuit outlet having a notch of specified dimension.

33. A flow insert as recited in claim 23, wherein:
the floor portion of said second flow circuit outlet having a notch of specified dimension.

34. A flow insert as recited in claim 23, wherein:
the roof portion of said first flow circuit outlet having a notch of specified dimension, and
the floor portion of said second flow circuit outlet having a notch of specified dimension.

35. A flow insert as recited in claim 23, wherein:
said first flow circuit being configured so that the fluid spray that exits from it has a prescribed yaw angle with respect to the centerline of said circuit.

36. A flow insert as recited in claim 23, wherein:
said second flow circuit being configured so that the fluid spray that exits from it has a prescribed yaw angle with respect to the centerline of said circuit.

37. A flow insert as recited in claim 23, further comprising:
a linking passage that connects said first interaction chambers of said circuits.

38. A flow insert that receives fluid under pressure and generates a specified spatial distribution of the fluid exiting said insert, said insert comprising:
a body member having top, bottom, front and rear outer surfaces,
at least two fluid flow circuits located within said member, each said circuit configured so that said circuit is connected to said pressurized fluid source,
wherein each of said flow circuits having a nozzle, an outlet downstream from said nozzle with the exit from said outlet lying within said member front surface,
wherein each of said flow circuits are chosen from the group consisting of steady state flow circuits and fluidic circuits,
said first of at least two flow circuits being configured so as to yield a spray having a specified horizontal fan angle, and
said second of at least two flow circuits being configured so as to yield a spray having a horizontal fan angle that is larger than that of said specified horizontal fan angle of said first flow circuit.

39. A flow insert that receives fluid under pressure and generates a specified spatial distribution of the fluid exiting said insert, said insert comprising:
a body member having top, bottom, front and rear outer surfaces,
at least two fluid flow circuits located within said member, each said circuit configured so that said circuit is connected to said pressurized fluid source,
wherein each of said flow circuits having a nozzle, an outlet downstream from said nozzle with the exit from said outlet lying within said member front surface,
wherein each of said flow circuits are chosen from the group consisting of steady state flow circuits and fluidic circuits,
said first of at least two flow circuits being configured so as to yield a spray having a specified horizontal fan angle, and
said second of at least two flow circuits being configured so as to yield a spray having a horizontal fan angle that is smaller than that of said specified horizontal fan angle of said first flow circuit.

40. A flow insert as recited in claim 38, wherein:
said first and second flow circuits being configured so that the centerlines of said flow circuits angle away from each other a specified amount so as to give a prescribed vertical included angle between the fluid sprays that flow from said circuits.

41. A flow insert as recited in claim 39, wherein:
said first and second flow circuits being configured so that the centerlines of said flow circuits angle away from each other a specified amount so as to give a prescribed vertical included angle between the fluid sprays that flow from said circuits.

42. A flow insert as recited in claim 38, wherein:
at least one of said flow circuits being configured so that the fluid spray that exits from it has a prescribed yaw angle with respect to the centerline of said circuit.

43. A flow insert as recited in claim 39, wherein:
at least one of said flow circuits being configured so that the fluid spray that exits from it has a prescribed yaw angle with respect to the centerline of said circuit.

44. A flow insert as recited in claim 40, wherein:
at least one of said flow circuits being configured so that the fluid spray that exits from it has a prescribed yaw angle with respect to the centerline of said circuit.

45. A flow insert as recited in claim 41, wherein:
at least one of said flow circuits being configured so that the fluid spray that exits from it has a prescribed yaw angle with respect to the centerline of said circuit.

* * * * *